United States Patent [19]
Raina

[11] Patent Number: 6,134,675
[45] Date of Patent: Oct. 17, 2000

[54] METHOD OF TESTING MULTI-CORE PROCESSORS AND MULTI-CORE PROCESSOR TESTING DEVICE

[75] Inventor: Rajesh Raina, Austin, Tex.

[73] Assignee: Motorola Inc., Schaumburg, Ill.

[21] Appl. No.: 09/006,876

[22] Filed: Jan. 14, 1998

[51] Int. Cl.[7] .................................................. G06F 11/00
[52] U.S. Cl. .............................. 714/37; 714/49; 714/39; 714/25; 714/31; 714/724
[58] Field of Search .................................. 714/37, 49, 39, 714/25, 31, 724

[56] References Cited

U.S. PATENT DOCUMENTS

| | | | |
|---|---|---|---|
| 4,764,925 | 8/1988 | Grimes et al. | 714/743 |
| 4,926,427 | 5/1990 | Remein | 714/819 |
| 5,193,092 | 3/1993 | Hartoog et al. | 714/732 |
| 5,260,948 | 11/1993 | Simpson et al. | 714/727 |
| 5,359,547 | 10/1994 | Cummins et al. | 702/119 |
| 5,412,664 | 5/1995 | Bank | 714/734 |
| 5,560,002 | 9/1996 | Kardach et al. | 713/500 |
| 5,577,199 | 11/1996 | Tanabe et al. | 714/37 |
| 5,596,765 | 1/1997 | Baum et al. | 712/38 |
| 5,802,378 | 9/1998 | Arndt et al. | 710/267 |
| 5,954,830 | 9/1999 | Ternullo, Jr. | 714/718 |

OTHER PUBLICATIONS

Miron Abramovici, et al., "Digital Systems Testing and Testable Design", Section 4.2 Fault Detection and Redundancy, published by IEEE Press, pp. 95–106.

Primary Examiner—Ayaz R. Sheikh
Assistant Examiner—Frantz B. Jean
Attorney, Agent, or Firm—Jeffrey G. Toler; Robert L. King

[57] ABSTRACT

A method of testing a multi-core processor that includes the steps of receiving a plurality of input signals from a plurality of processor cores (100), and producing an output signal corresponding to a disable state when at least two of the plurality of input signals represent a different logic value (106). A testing device (12) includes a multiplexer (40) responsive to a plurality of input signals (24, 26, 28, 30) from a plurality of processor cores (14, 16, 18, 20), and an output driver (48) responsive to the multiplexer (40). The output driver (48) produces an output signal (62) corresponding to a disable state when at least two of the plurality of input signals (24, 26, 28, 30) represent a different logic value.

18 Claims, 3 Drawing Sheets

METHOD OF TESTING MULTI-CORE PROCESSORS AND MULTI-CORE PROCESSOR TESTING DEVICE

FIELD OF THE INVENTION

The present invention relates generally to testing integrated circuits and more particularly to testing multi-core processors.

BACKGROUND OF THE INVENTION

Many current testing methods are used for integrated circuits with many microprocessor cores. In one technique, a single test is performed on each of the many (N) microprocessor cores at the same time and the test result is read from N output pin sets. In another conventional method, a single output pin set is used, but the test is repeated N times. It would be desirable to test the integrated circuit with multiple processor cores using a single test and using a single output pin set since a premium is placed on reducing the number of pin sets and reducing testing time.

Accordingly, there is a need for an improved method and device for testing multi-core processor integrated circuits.

BRIEF DESCRIPTION OF THE DRAWINGS

While the invention is pointed out with particularity in the appended claims, other features of the invention are disclosed by the following detailed description and the accompanying drawings, in which:

DETAILED DESCRIPTION OF THE PREFERRED EMBODIMENT(S)

Generally, the present invention relates to a method of testing a multi-core processor and to a multi-core processor testing device. In accordance with a particular embodiment, the method includes the steps of receiving a plurality of input signals from a plurality of processor cores and producing an output signal corresponding to a disable state when at least two of the plurality of input signals represent a different logic value.

In accordance with another aspect of the present invention, the method includes the steps of receiving a plurality of input signals from a plurality of processor cores and producing an output signal that corresponds to one of a first and second state when each of the plurality of input signals represent the same digital logic value and corresponds to a third state when at least two of the plurality of signals represent different logic values.

In accordance with another aspect of the present invention, the multi-core processor testing device includes a multiplexer responsive to a plurality of input signals from a plurality of processor cores and an output driver responsive to the multiplexer. The output driver produces an output signal that corresponds to a disable state when at least two of the plurality of signals represent different logic values.

It should be noted that the particular terms and expressions employed and the particular structural and operational details disclosed in the detailed description and accompanying drawings are for illustrative purposes only and are not intended to in any way limit the scope of the invention as described in the appended claims.

Figure 1:
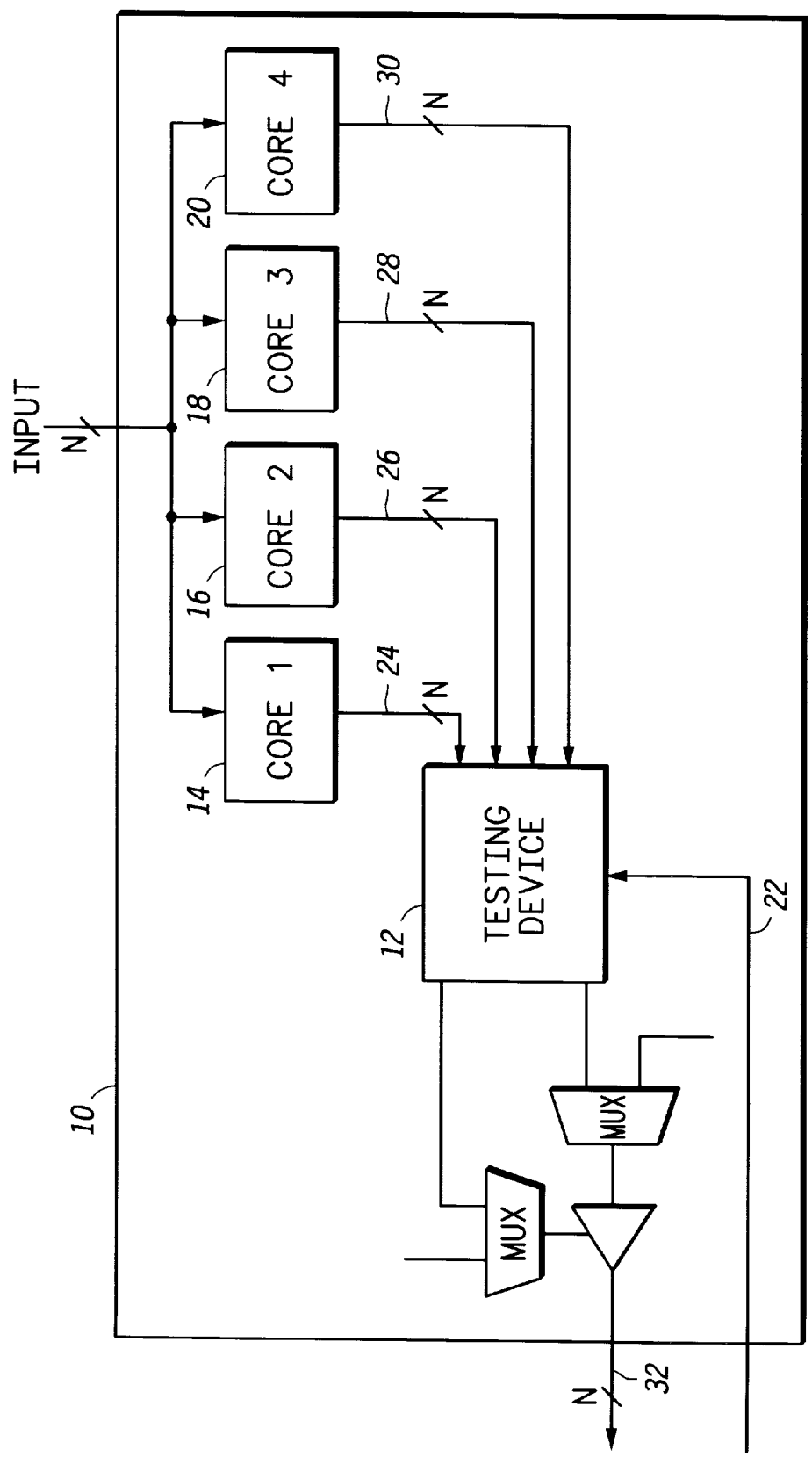
FIG. 1 is a block diagram of an embodiment of a system that uses a multi-core processor testing device in accordance with the present invention.

Referring to FIG. 1, an embodiment of a system 10 that uses a testing device 12 is disclosed. The system 10 includes a plurality of microprocessor cores 14, 16, 18, and 20 to be tested by the testing device 12. The testing device 12 receives a core selection 22 and a plurality of input signals 24, 26, 28 and 30 from the plurality of processor cores 14, 16, 18 and 20. The testing device 12 produces a test result output 32 that is to be compared with an expected logic value using an external tester 70 to determine a testing result 76. While the particular exemplary embodiment of FIG. 1 illustrates four processor cores, it is to be understood that the present invention is applicable to testing a plurality of processor cores.

Figure 2:
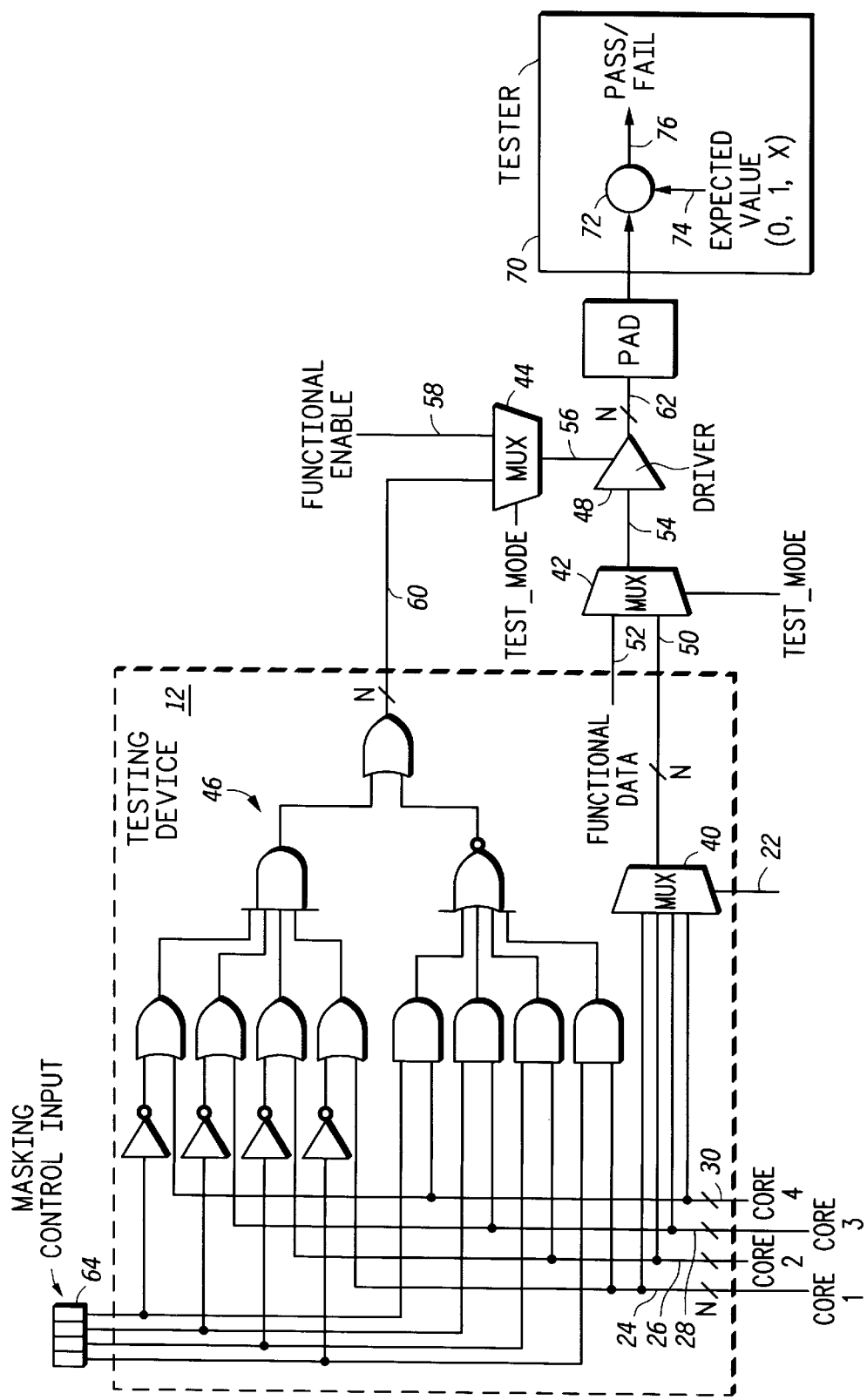
FIG. 2 is a block diagram of the multi-core processor testing device of FIG. 1.

Referring to FIG. 2, an embodiment of the testing device 12 is disclosed. The testing device 12 includes a multiplexer 40, a first selector 42, a second selector 44, digital comparison and masking logic 46, and an output driver 48. The multiplexer 40 receives the plurality of input signals 24, 26, 28 and 30 from the plurality of processor cores 14–20 and produces a multiplexed output 50. The first selector 42 receives the multiplexed output 50 and feeds either the multiplexed output 50 or functional data 52 to the input 54 of the driver 48. The output driver 48 has an enable/disable input 56 that receives an output of the second selector 44. The second selector 44 receives a functional enable signal 58 and receives a comparison logic output 60 from comparison and masking logic module 46. The comparison and masking logic module 60 includes masking digital logic to mask out any processor cores that are de-selected for testing by the masking control input lines 64. An example of the illustrative masking logic is disclosed in FIG. 2.

In a particular illustrative embodiment, the output driver 48 is a Motorola/Somerset model xb$_{13}$ ocd driver from the Hip4 cell library. The multiplexer 40 and the selectors 42, 44 are ots$_{13}$1112_mux4 model multiplexers from the Motorola/Somerset Hip4 custom cell library. The processor cores 14, 16, 18 and 20 may be PowerPC® 750 type of processors available from Motorola. The input signals 24, 26, 28 and 30 may be signal sets generated by the processor cores 14, 16, 18 and 20. The above described specific components are only to provide a specific example configuration and are not intended to in any way limit the scope of the present invention. Those skilled in the art will appreciate that many other types of components may be used.

During operation, the output driver 48 may operate in a non-test mode or in a testing mode. In the non-test mode, the driver 48 is enabled by the second selector 44 passing the functional enable signal 58. In this mode, the driver 48 passes on functional data 52 input to the first selector 42. In this non-test mode, the operation of the testing device 12 is essentially transparent to the system 10.

In the test mode, the output driver 48 receives input from the multiplexed output 50 of the multiplexer 40. In addition, the output driver 48 receives the comparison logic output 60 from the comparison and masking logic module 46 at its enable/disable input 56. The logic in the comparison and masking logic module 46 is configured such that the output driver 48 produces an output signal 62 that is a logical zero when all of the input signals 24, 26, 28 and 30 from the processor cores 14, 16, 18 and 20 are also at a logical zero value and produces a logical one when all of the input signals 24, 26, 28 and 30 are at a logical one value. However, when at least two of the input signals have different values, then the output driver 48 is disabled by the comparison logic output 60 being applied to the disable input 56 of the output driver 48. In this case, the output driver 48 produces an output signal 62 that corresponds to a disable state, such as a z-state signal. The z-state signal has a detectable impedance that differs from either the digital logic zero or digital logic one values. The output signal 62 is then available for comparison with an expected test value 74 by an external testing device 70. The external testing device 70 includes a comparator 72 to compare the output signal 62 with the expected test value to produce a test result signal 76.

Figure 3:
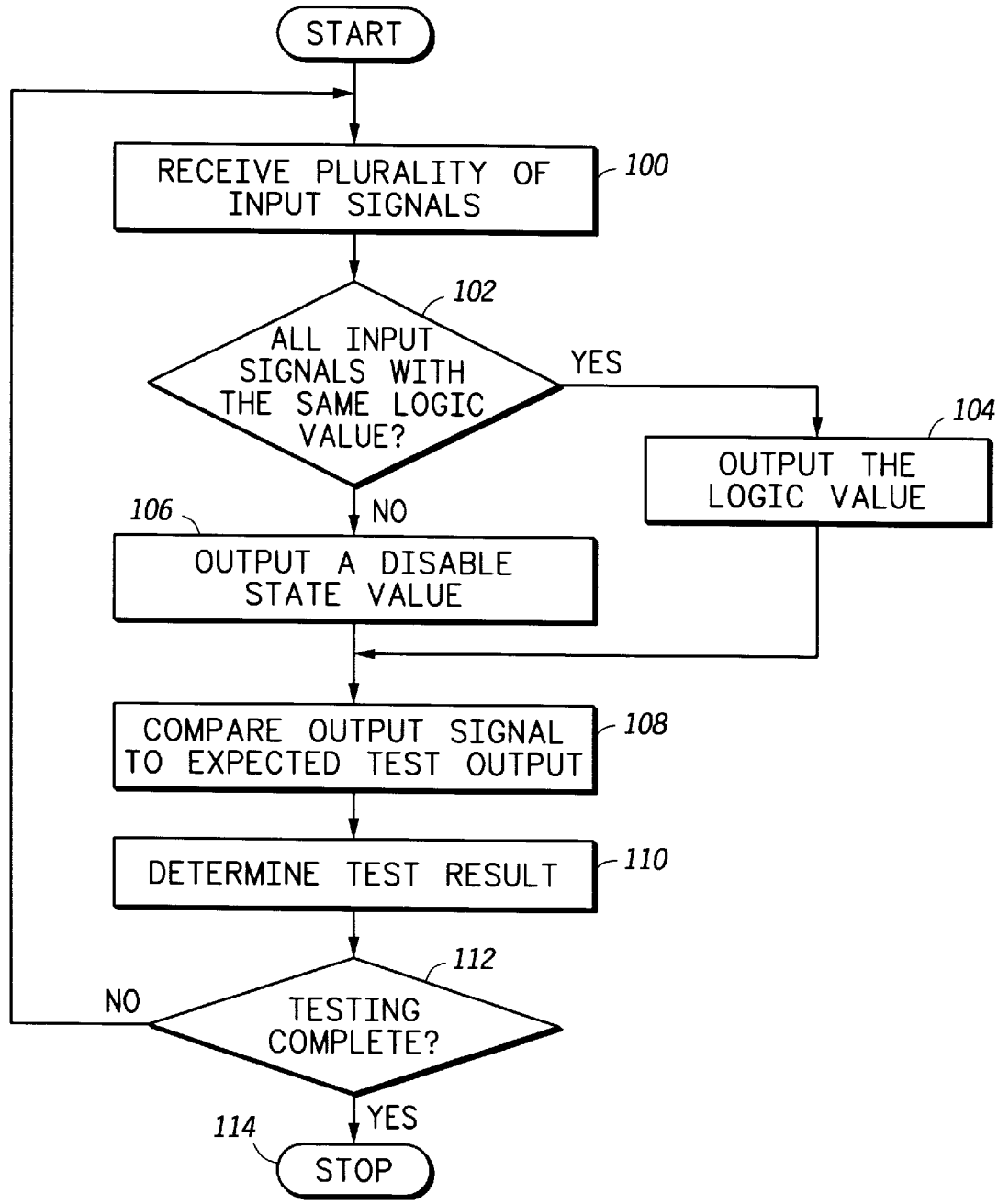
FIG. 3 is a flow chart illustrating operation of the multi-core processor testing device of FIG. 2.

Referring to FIG. 3, a flow chart of a method of testing a multi-core processor is disclosed. A plurality of input signals from a plurality of processor cores is received, at step 100. A comparison is performed on the input signals, at step 102. If all of the input signals have the same logic value, then that logic value is output, at step 104. If all of the input signals do not have the same logic value, then a disable state value is output, at state 106. Next, an expected test output is compared to the output signal, at step 108, and a test result is determined, at step 110. Typically, the test result is either a pass or a fail indication. In a particular testing method, a pass is indicated when the expected testing output either matches the output signal (e.g. expect a logic zero and receive a logic zero) or when the expected testing output is a don't care state. For example, when a don't care state is the expected testing output, either a logic zero, a logic one, or a disable output (e.g. z-state) will result in a test pass. When either a logic zero or a logic one is the expected testing output, then the test result will be a failed test if the output signal is the disable state.

After the testing result is produced and preferably recorded, a comparison is made to determine if testing is completed, at step 112. If testing is completed, then processing stops at step 114. Otherwise, the testing method is repeated for the next test, at step 100.

By testing multiple processor cores at the same time using a single output from the output driver 48, testing time is beneficially reduced. In addition, since the output driver 48 may be routed to a single output pin set, the number of pins at the testing output is also beneficially reduced. In this manner, the above embodiment has provided an improved method and device for testing multi-core processor integrated circuits. More specifically, the above described method and testing device beneficially allows testing of an integrated circuit with multiple cores using a single test and using a single output pin set.

Thus, there has been described herein at least one embodiment including at least one preferred embodiment of a method and device for testing multi-core processors. It will be apparent to those skilled in the art that the disclosed subject matter may be modified in numerous ways and may assume many embodiments other than the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather than the foregoing detailed description.

What is claimed is:

1. A method of testing a multi-core processor comprising the steps of:

providing a plurality of processor cores within a single integrated circuit;

providing a test input signal to the plurality of processor cores for use when the integrated circuit is in a test mode, the test input signal selected to provide an expected test output signal value at an output pin of the integrated circuit;

processing the test input signal with the plurality of processor cores and providing a plurality of core test signals in response thereto;

coupling the plurality of core test signals from the plurality of processor cores to testing logic circuitry within the single integrated circuit;

using the testing logic circuitry to produce an output signal at the output pin of the integrated circuit, the output signal having a value indicating when at least two of the plurality of core test signals represent different logic values, wherein the output pin of the integrated circuit is the only pin within the integrated circuit used to test the plurality of processor cores and the plurality of processor cores are tested substantially at the same time; and repeating the steps by providing at least one additional test input signal to the plurality of processor cores.

2. The method of claim 1, wherein the output signal represents a first logic value when each of the plurality of core test signals represents the first logic value and wherein a disable state is indicated by a z-state output signal which has a detectable impedance differing from logic signals used within the integrated circuit.

3. The method of claim 2, wherein the output signal represents a second logic value when each of the plurality of core test signals represents the second logic value.

4. The method of claim 3, wherein the first logic value and the second logic value are digital logic values.

5. The method of claim 2, further comprising the step of providing a disable signal from the testing logic circuitry to disable an output driver to produce the output signal corresponding to the disable state.

6. The method of claim 1, wherein the output signal is compared against an expected output value to determine a test result by using test equipment external to the single integrated circuit.

7. The method of claim 1, further comprising the step of masking at least one of the plurality of core test signals prior to producing the output signal by nulling the at least one of the plurality of core test signals within the testing logic circuitry.

8. An integrated circuit having multi-core testing circuitry, comprising:

a plurality of core units within the integrated circuit, each of the plurality of core units adapted to receive a test input signal which is selected to provide an expected test output signal value at an output pin of the integrated circuit, and providing one of a plurality of input signals in response thereto;

a multiplexer coupled to the plurality of core units and responsive to the plurality of input signals from the plurality of core units;

logic test circuitry coupled to the plurality of core units for determining if at least two of the plurality of input signals represent different logic values; and an output driver responsive to the multiplexer and logic test circuitry, the output driver providing an output signal to the output pin of the integrated circuit, the output signal value providing an external indication whether processing by each of the plurality of core units of the test input signal created differing results from any of the plurality of core units, wherein the output pin is the only pin of the integrated circuit which is used for testing of the plurality of core units and the plurality of core units is tested at substantially the same time.

9. The integrated circuit of claim 8, wherein the output driver produces the output signal with a first logic value when each of the plurality of input signals represents the first logic value.

10. The integrated circuit of claim 9, wherein the output driver produces the output signal with a second logic value when each of the plurality of input signals represents the second logic value.

11. The integrated circuit of claim 10, wherein the first logic value and the second logic value are digital logic values.

12. The integrated circuit of claim 8, wherein the output driver is disabled by the logic test circuitry when the logic test circuitry determines that processing by each of the plurality of core units of the test input signal created differing results, the output driver producing the output signal having an impedance differing from a logic one or logic zero binary value in response to the output driver being disabled.

13. The integrated circuit of claim 8, further comprising digital logic operable for masking at least one of the plurality of input signals.

14. A method of testing a multi-core processor comprising the steps of:

providing a plurality of processor cores on a single integrated circuit;

inputting a test signal to the plurality of processor cores, the test signal having a test value selected to provide an expected output value;

testing the plurality of processor cores at substantially the same time;

generating a plurality of input signals from the plurality of processor cores processing the test signal and coupling the plurality of input signals to digital test circuitry; and producing an output signal at an output pin of the single integrated circuit, the output pin being the only pin of the integrated circuit which is used for testing of the plurality of processor cores, the output signal corresponding to one of a first and second state when each of the plurality of input signals represent a same digital logic value and the output signal corresponding to a third state having a detectable impedance differing from the first and second state when at least two of the plurality of signals represent different logic values.

15. The method of claim 14, wherein the first and second states, but not the third state, represent digital logic values.

16. The method of claim 15, wherein the third state represents a device disable state.

17. The method of claim 16, wherein the device disable state is indicated by a z-state output level.

18. The method of claim 14, wherein the first state indicates a logical zero value and the second state indicates a logical one value.

* * * * *